(12) United States Patent
Zamfir et al.

(10) Patent No.: US 7,680,028 B1
(45) Date of Patent: Mar. 16, 2010

(54) METHOD AND APPARATUS FOR RESTARTING RSVP PROCESSES IN MULTIPLE NETWORK DEVICES

(75) Inventors: Anca Zamfir, Ottawa (CA); Junaid Israr, Ottawa (CA); Reshad Rahman, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 1499 days.

(21) Appl. No.: 10/718,784

(22) Filed: Nov. 21, 2003

(51) Int. Cl.
*H04L 12/26* (2006.01)
(52) U.S. Cl. .................................. 370/216
(58) Field of Classification Search ............ 370/419, 370/389, 254, 216
See application file for complete search history.

(56) References Cited

U.S. PATENT DOCUMENTS 7,317,731 B2 * 1/2008 Seddigh et al. ............ 370/419
7,359,377 B1 * 4/2008 Kompella et al. .......... 370/389

OTHER PUBLICATIONS

K. Kompella, et al., "Signalling Unnumbered Links in Resource ReSerVation Protocol—Traffic Engineering (RSVP-TE)," Jan. 2003, Network Working Group, Request for Comments: 3477, pp. 1-9.

Cisco Systems, Inc., "Resource Reservation Protocol," Chapter 48, Internetworking Technologies Handbook, pp. 48-1-48-12, year 2000.
Awduche, et al., "Extensions to RSVP for LSP Tunnels," Dec. 2001, RFC 3209, pp. 49-61.
Reshad Rahman, et al., "RSVP Graceful Restart Extensions," Network Working Group, Internet Draft, pp. 1-9, Oct. 2003.
Berger, "GMPLS Signaling—RSVP-TE Extensions," Jan. 2003, RFC 3473, pp. 25-30.
R. Braden, et al., "Resource ReSerVation Protocol (RSVP)—Version 1 Functional Specification," Network Working Group, Request for Comments: 2205, pp. 1-112, Sep. 1997.

* cited by examiner

*Primary Examiner*—Steven H Nguyen
*Assistant Examiner*—Alex Skripnikov
(74) *Attorney, Agent, or Firm*—Hickman Palermo Truong & Becker LLP

(57) ABSTRACT

An RSVP node that has crashed and restarted sends a non-zero Recovery Time value in a Restart_Cap object of a Hello message. Other nodes receiving such messages can detect, based on the non-zero Recovery Time value, that the sending node is restarting. In particular, a first RSVP node can detect whether a second, neighbor node has restarted regardless of the order of restart with respect to the first and second nodes. As a result, the first node can determine whether to forward PATH messages with Recovery Label or Suggested Label, as appropriate or necessary to rebuild label-switched paths with crashed and restarted nodes. Therefore, when multiple RSVP nodes crash relatively concurrently, the multiple nodes can restart gracefully and automatically detect what kind of communication to use in order to rebuild label-switched paths among themselves.

25 Claims, 7 Drawing Sheets

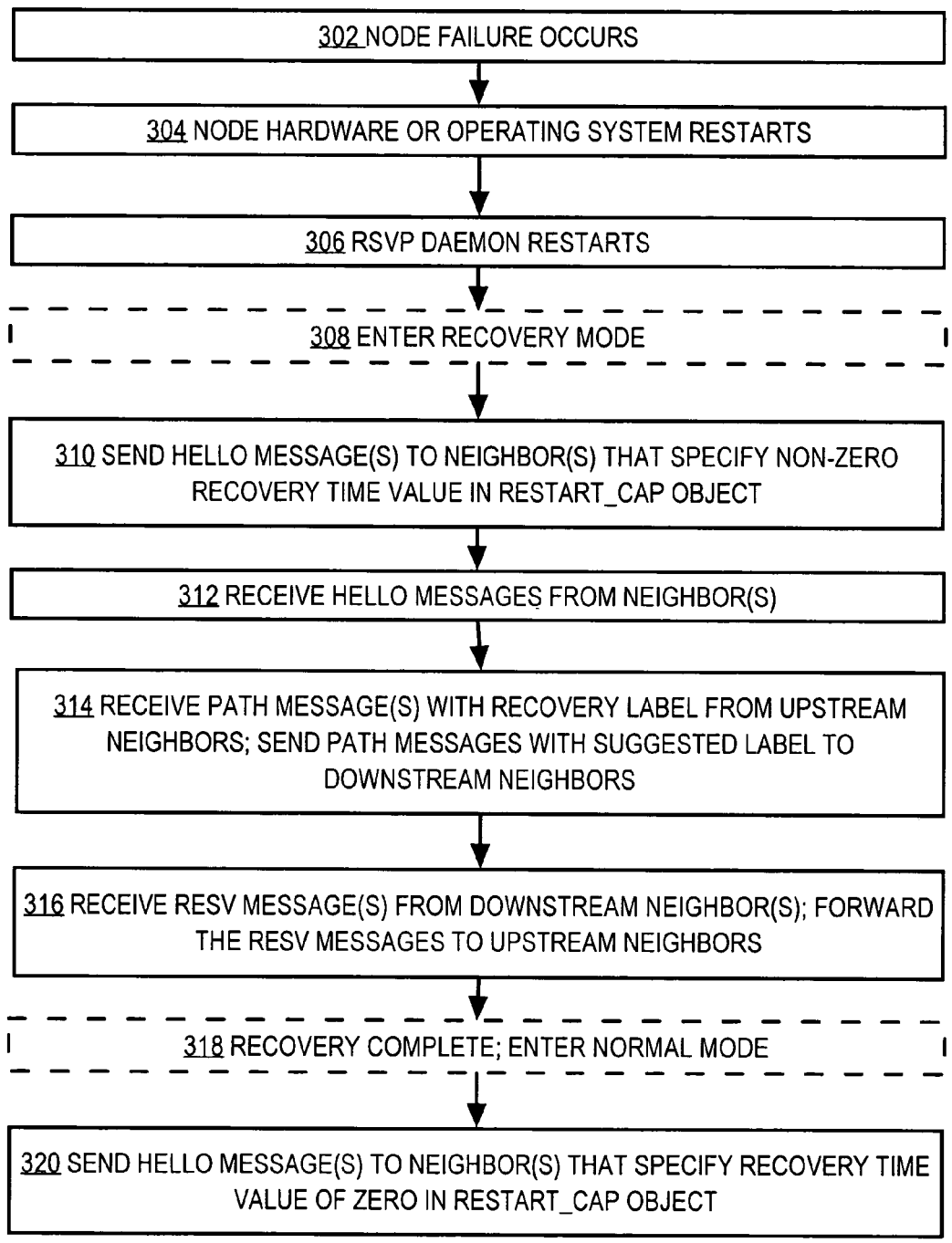

*Fig. 3A*

INTERNET-DRAFT PROCESS AS PERFORMED BY ANY RESTARTING RSVP NODE

302 NODE FAILURE OCCURS

304 NODE HARDWARE OR OPERATING SYSTEM RESTARTS

306 RSVP DAEMON RESTARTS

308 ENTER RECOVERY MODE

310 SEND HELLO MESSAGE(S) TO NEIGHBOR(S) THAT SPECIFY NON-ZERO RECOVERY TIME VALUE IN RESTART_CAP OBJECT

312 RECEIVE HELLO MESSAGES FROM NEIGHBOR(S)

314 RECEIVE PATH MESSAGE(S) WITH RECOVERY LABEL FROM UPSTREAM NEIGHBORS; SEND PATH MESSAGES WITH SUGGESTED LABEL TO DOWNSTREAM NEIGHBORS

316 RECEIVE RESV MESSAGE(S) FROM DOWNSTREAM NEIGHBOR(S); FORWARD THE RESV MESSAGES TO UPSTREAM NEIGHBORS

318 RECOVERY COMPLETE; ENTER NORMAL MODE

320 SEND HELLO MESSAGE(S) TO NEIGHBOR(S) THAT SPECIFY RECOVERY TIME VALUE OF ZERO IN RESTART_CAP OBJECT

PROCESS OF DETECTING A RESTARTING NODE,
AS PERFORMED BY NODE NEIGHBORING A RESTARTING NODE

PROCESS OF HANDLING A PATH MESSAGE BY A RESTARTING NODE

US 7,680,028 B1

METHOD AND APPARATUS FOR RESTARTING RSVP PROCESSES IN MULTIPLE NETWORK DEVICES

FIELD OF THE INVENTION

The present invention generally relates to computer networks that use Resource Reservation Protocol (RSVP) and Multi-protocol Label Switching (MPLS). The invention relates more specifically to techniques for restarting multiple RSVP processes in a network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In packet-switched networks consisting of multiple network elements such as routers and switches, the Resource Reservation Protocol ("RSVP") may be used to reserve routing paths for the purpose of providing optimized routing of specified kinds of network traffic, such as voice traffic. RSVP is described in Braden et al., "Resource ReSerVation Protocol (RSVP)—Version 1, Functional Specification," Request for Comments (RFC) 2205 of the Internet Engineering Task Force (IETF), September 1997. In general, RSVP can be used to reserve resources in order to achieve a desired quality of service (QoS) for a particular kind of traffic. Resource reservations established using RSVP messages expire over time unless the reservations are refreshed.

RSVP defines sessions and flow descriptors. A session encompasses a data flow that is identified by its destination. A flow descriptor is a resource reservation that encompasses a filter specification (filterspec) and a flow specification (flowspec). When the reservation is implemented at a router, packets that pass a filter defined by the filterspec are treated as defined by the flowspec. RSVP operation is controlled using Path messages and Resv (reservation) messages.

In general, RSVP operation at a host such as a router proceeds as follows. A sender issues a Path message; a receiver receives the message, which identifies the sender. As a result, the receiver acquires reverse path information and may start sending Resv messages to reserve resources at intermediate hosts. The Resv messages propagate through the internet and arrive at the sender. The sender then starts sending data packets and the receiver receives them.

Extensions to RSVP for various purposes are described in RFC 3209, RFC 3471, RFC 3473, and RFC 3477, full citations of which are: "Extensions to RSVP for LSP Tunnels", D. Awduche, et al, RFC 3209, December 2001; "Generalized Multi-Protocol Label Switching (GMPLS) Signaling Functional Description", RFC 3471, L. Berger, et al., January 2003; "Generalized Multi-Protocol Label Switching (GMPLS) Signaling Resource ReSerVation Protocol-Traffic Engineering (RSVP-TE) Extensions", RFC 3473, L. Berger, et al, January 2003; "Signaling Unnumbered Links in Resource ReSerVation Protocol—Traffic Engineering (RSVP-TE)", RFC 3477, K. Kompella, Y. Rekhter, January 2003. Throughout this document, familiarity with all the foregoing references is assumed.

In one respect, these extensions enable RSVP to interoperate with processes that implement Multi-Protocol Label Switching (MPLS). MPLS provides a way to establish expedited routing paths in networks. A management station can instruct a router that all packets bearing a specified label and arriving on a particular ingress port should be immediately routed to a particular egress port with a specified egress label applied to the packet upon egress. In this way, labeled packets bypass normal route processing decisions and move more rapidly through the network. Such expedited treatment is beneficial for network traffic that is sensitive to routing delays or latency, such as voice traffic.

Typically, a software process implements RSVP in a router or switch. However, the RSVP process, or other elements of the router or switch, may fail periodically, and therefore there is a need for a way to restart the RSVP process and re-establish knowledge of paths and labels.

RFC 3209, section 5, describes a "Hello" extension to RSVP that enables one RSVP node to detect that a neighboring RSVP node has failed, by sending a "Hello" message and awaiting an acknowledgment. RFC 3473, section 9, describes an RSVP restart procedure that may be termed "graceful restart." The graceful restart procedure enables a network element that has experienced a failure in the MPLS control plane, but that has preserved information in the MPLS forwarding plane (a "nodal fault" in the terminology of RFC 3473), to re-create state information necessary for subsequent processing of RSVP messages and labeled packets.

According to RFC 3473, a network node recreates its state information based on replayed RSVP messages received from neighboring nodes, and also based on retrieving information from its own forwarding plane. Using this procedure, nodes acting as endpoints of MPLS label switched paths can retrieve port and label information. Nodes acting as midpoints in MPLS paths can obtain cross-connect information that defines which egress port and egress label is applied to packets arriving at a specified ingress port with a specified ingress label.

Under certain circumstances, the RSVP processes of multiple nodes in a network may fail concurrently. Such multiple failures may arise when a first node fails and a second node is unable to obtain needed information and therefore fails. Alternatively, a hardware fault or software fault unrelated to RSVP or MPLS may result in cascading failures of RSVP processes on several nodes. Thus, there is a need for a way to properly handle the restart of multiple RSVP processes on different nodes.

The graceful restart procedure of RFC 3473 is adequate for some cases of multiple node restart, but not all. For purposes of illustrating the deficiencies of RFC 3473, FIG. 1 is a simplified block diagram of a hypothetical network. Network 100 comprises network elements R1, R2, R3, which are communicatively coupled by links L1, L2. The network elements R1, R2, R3 comprise routers or switches, and links L1, L2 are any form of communication link. Assume that R1 has sent PATH messages that establish a label switched path spanning L1, R2, L2, R3.

In this arrangement, assume that RSVP processes on R2 and R3 have failed. Assume further that the RSVP process of R2 restarts and sends Hello packets to its neighbors, as provided in RFC 3209 and RFC 3473. If R3 restarts after the Hello packets are sent, then R2 is able to determine that R3 has restarted. To re-establish the label switched path described above, R1 then sends a PATH message that includes a Recovery label. R2 sends the PATH message on to R3, and also includes a Recovery label. Accordingly, R1, R2, and R3 properly re-establish the path, and in particular, R2 and R3 can correctly recover all RSVP state information that they had before restarting.

However, if R2 restarts and then R3 restarts before R2 has sent Hello packets, then RFC 3473 provides no way for R2 to detect that R3 has restarted and is in Recovery mode. Instead, in this scenario R2 can send a Hello packet, which R3 acknowledges properly because R3 has completed restarting. Therefore R2 assumes that R3 never failed at all, and there is no way defined in the protocol or its extensions to determine that an intervening failure occurred. Accordingly, when R2 receives a PATH message from R1 with a Recovery Label, R2 will send a PATH message on to R3 that includes a Suggested Label rather than a Recovery Label, because R2 is unaware that R3 previously received the same path. Including a Suggested Label is incorrect, because upon receiving the PATH message, R3 will find a duplicate label in its forwarding plane information and will be unable to accept the Suggested Label.

The RFCs defining RSVP permit establishing new label switched paths only if they do not collide with label switched paths that are in the process of being recovered. Therefore, R3 will either reject the PATH message, or accept the PATH message but use an upstream label different than the Suggested Label. In either case, R3 fails to re-establish the state it had before failure.

Thus, there is a need for an improved process for multiple RSVP nodes to recover from failure.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram of a process of restarting an RSVP process at a network node;

DETAILED DESCRIPTION OF THE PREFERRED EMBODIMENT

Figure 1:
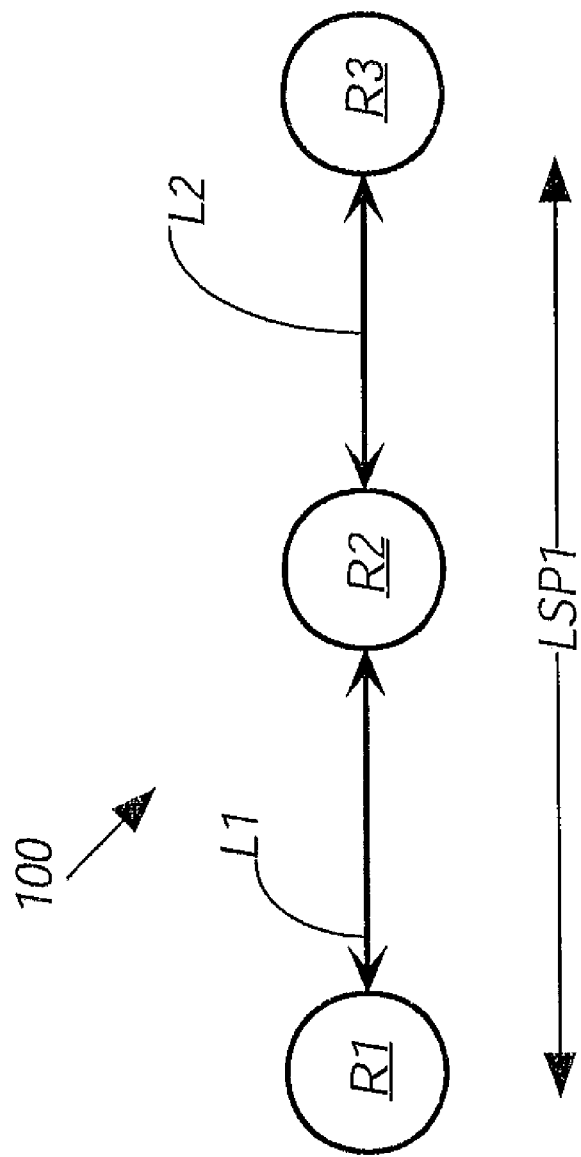
FIG. 1 is a simplified block diagram of a hypothetical network.

A method and apparatus for restarting RSVP processes in multiple network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 RSVP Restart Techniques
   2.1 Process of Restarting RSVP Processes in Multiple Network Devices
   2.2 ERO Recovery Object
3.0 Implementation Mechanisms - Hardware Overview
4.0 Extensions and Alternatives 1.0 General Overview The needs identified in the foregoing Background, and other needs and objects that will become apparent for the following description, are achieved in the present invention, which comprises, in one aspect, a method of restarting resource reservation protocol (RSVP) processes in multiple network devices, comprising the computer-implemented steps of entering a recovery mode; sending a Hello message to a first neighbor RSVP node, wherein the Hello message comprises a non-zero Recovery Time value; completing the recovery mode; and sending a Hello message to the first neighbor RSVP node, wherein the Hello message comprises a Recovery Time value of zero. In one feature, the method further comprises receiving, from a second neighbor RSVP node, a Hello message having a non-zero Recovery Time value; and storing information specifying that the second neighbor RSVP node is in a recovery mode.

In another feature, the method further comprises receiving, from the second neighbor RSVP node, a Hello message having a zero Recovery Time value; and storing information specifying that the second neighbor RSVP node is in a normal mode. In still another feature, the step of creating and storing information further comprises the steps of receiving an RSVP PATH message that contains a Recovery Label; and forwarding the PATH message to a downstream node with the Recovery Label only in response to determining that the downstream node is in recovery mode.

In yet another feature, the method further comprises forwarding the PATH message to a downstream node with a Suggested Label in response to determining that the downstream node is not in recovery mode. In a related feature, the determining step is performed based on whether a Recovery Time value in a previously received Hello message is non-zero.

In other aspects, the invention encompasses a computer apparatus and a computer-readable medium configured to carry out the foregoing steps.

In general, in the approaches herein, an RSVP node that has crashed and restarted sends a non-zero Recovery Time value in a Restart_Cap object of a Hello message. Other nodes receiving such messages can detect, based on the non-zero Recovery Time value, that the sending node is restarting. In particular, a first RSVP node can detect whether a second, neighbor node has restarted regardless of the order of restart with respect to the first and second nodes. As a result, the first node can determine whether to forward PATH messages with Recovery Label or Suggested Label, as appropriate or necessary to rebuild label-switched paths with crashed and restarted nodes. Therefore, when multiple RSVP nodes crash relatively concurrently, the multiple nodes can restart gracefully and automatically detect what kind of communication to use in order to rebuild label-switched paths among themselves.

2.0 RSVP Restart Techniques 2.1 Method of Restarting RSVP Process in Multiple Network Nodes The following description assumes familiarity with the technical references identified in the Background, especially RFC 3473, section 9.

Figure 2:
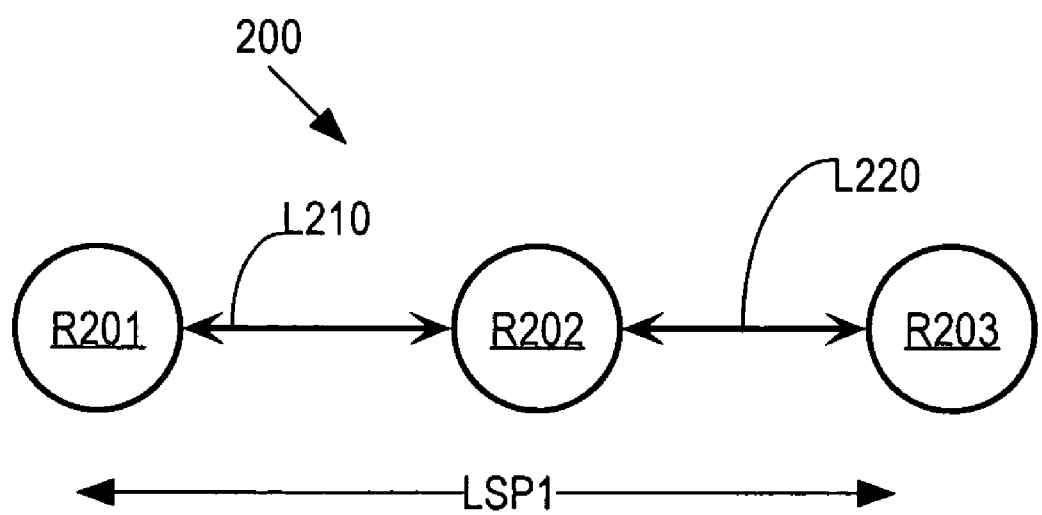
FIG. 2 is a simplified block diagram of another hypothetical network.

FIG. 2 is a simplified block diagram of another hypothetical network. Network 200 comprises network elements R201, R202, R203, which are communicatively coupled by links L210, L220. The network elements R201, R202, R203, comprise routers or switches, and links L210, L220 are any form of communication link. R201 has sent PATH messages that establish a label switched path LSP1 spanning L210, R202, L220, and R203.

Assume that R201 and R202 both fail. R201 and R202 restart and enter the recovery phase defined in RFC 3473. In this document, the terms "recovery phase" and "recovery mode" are considered equivalent. In conventional practice under RFC 3473, if the node R201 upstream of the restarting node R202 is also in the recovery phase, then the label switched path LSP1 is recovered only when R201 has restarted prior to R202. In this case R201 will send at least one Hello message that is not acknowledged by R202 because R202 is restarting. R201 therefore determines, based on the exchange of Hello messages, that R202 has restarted and sends Path Messages with a Recovery Label for the LSPs that need to be recovered.

However, if R201 restarted after R202, R201 cannot determine based on the Hello messages that R202 is a restarting node. In this case, when R201 sends a Hello message, R202 has restarted and acknowledges the message. Therefore R201 cannot determine that R202 ever failed. R201 sends Path messages with a Suggested Label to R202 as indicated in RFC3473. R202 does not use the Suggested Label, because its forwarding indicates that a Recovery Path message may be received from R201. In fact, it may setup a new LSP2 using a different label. Further, in the case of GMPLS, messages from different upstream neighbors may be received on the same interface, which may be different from the interface hosting the LSP to be recovered.

In one embodiment, in the approach herein, the Recovery Time value received by a restarting node is used as an indication that its downstream neighbor is in recovery mode. Specifically, a node that is in recovery mode sends a Hello message with the Restart_Cap object as defined in RFC 3473, but includes a non-zero Recovery Time value, which is not conventional under RFC 3473. The node sends a Recovery Time value of zero when recovery has completed, which is new in the approach herein and is not conventional under RFC 3473.

Further, when an RSVP node receives a Hello message that contains a non-zero Recovery Time value, the receiving node determines that the sending node is in recovery mode. Therefore, the receiving node sends Path messages with Recovery Label to re-establish a particular label switched path at the sending node. When the receiving node subsequently receives a Hello message that contains a Recovery Time value of zero, the receiving node sends any future Path messages with Suggested Label. An RSVP node may track whether its neighbor nodes are in the recovery state using any appropriate data structure, such as a table that associates node identifiers to state values.

In an alternative embodiment, restarting nodes that receive a Path message with Recovery Label then invariably forward, after processing, a corresponding Path message with Recovery Label and not Suggested Label.

To allow for recovery to complete, a restarting node may adjust its advertised Recovery Time when an upstream node restarts, in an attempt to prevent the downstream nodes from expiring state information that may be recovered later than expected.

A node that does not implement the approaches herein and has no proprietary way to detect at restart time the downstream neighbors that have previously restarted and that are in the recovery mode, may ignore the Recovery Time in the Restart_Cap object and may forward only Path messages with Suggested Label.

A node that does implement the approaches herein and that receives a Restart_Cap object with a non-zero Recovery Time from a downstream node that does not comply with this specification, forwards Path messages with Recovery Label included for all recovered LSPs while in the recovery period. If in fact the downstream node is not in Recovery mode and receives a Path message with a Recovery Label, the downstream node should generate a Resv message and normal state processing continues.

FIG. 3A is a flow diagram of a process of restarting an RSVP process at a network node. In block 302, a node failure occurs. For purposes of this description, the exact type of node failure is not critical, although this description assumes that regardless of the type of vault, the RSVP process fails and requires restarting. In block 306, an RSVP daemon restarts. The RSVP daemon is a process supervised by an operating system of a network element that implements the RSVP protocol on that device.

In block 308, the RSVP daemon enters a recovery mode. In the recovery mode, the node sends Hello messages to neighbors, as shown in block 310. The Hello messages specify a non-zero Recovery Time value. For example, the Hello messages conform to IETF RFC 3209, 3473 and include a non-zero Recovery Time value in the Restart_Cap object of the Hello messages.

In block 312, the node receives a responsive Hello message from its neighbors, which may be a Hello Acknowledgment or Hello Request. In block 314, the node receives one or more PATH messages with Recovery Label from its upstream neighbors, and sends PATH messages with Suggested Label to its downstream neighbors, for the purpose of signaling to downstream nodes that the node is re-establishing label-switched paths at the downstream nodes as part of the recovery mode. In response, in block 316 the node receives one or more RESV messages from downstream neighbor nodes, and forwards the RESV messages to its upstream neighbors. Blocks 314, 316 are repeated as needed to re-establish all label-switched paths that are represented in the node's RSVP path table.

In block 318, recovery is complete, and therefore the node enters a normal operational mode. In response to ending the recovery mode, the node sends one or more Hello messages to its neighbors, and these Hello messages specify a Recovery Time value of zero. For example, the Hello messages conform to IETF RFC 3209, 3473 and include a zero Recovery Time value in the Restart_Cap object of the Hello messages.

Figure 3B:
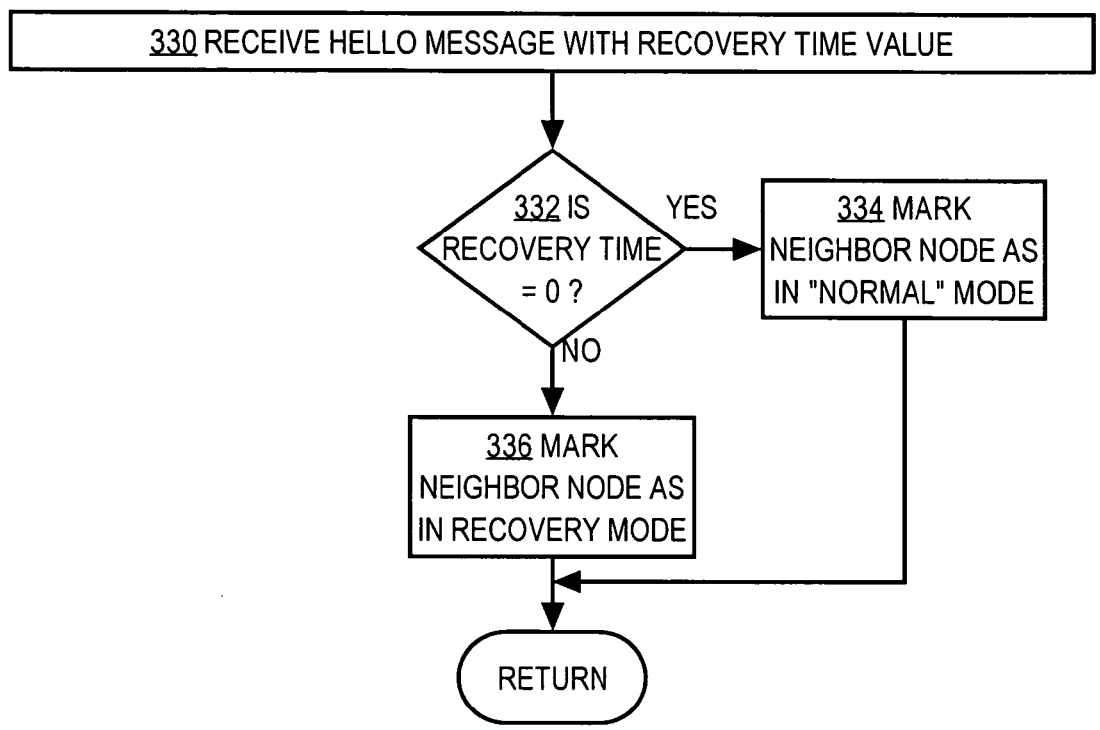
FIG. 3B is a flow diagram of a process of detecting a restarting node, as performed by a node neighboring a restarting node.

FIG. 3B is a flow diagram of a process of detecting a restarting node, as performed by a node neighboring a restarting node. In block 330, a Hello message with a Recovery Time value is received. In certain embodiment, the Recovery Time value is packaged in a Restart_Cap object. In block 332, a test is performed to determine whether the Recovery Time value is zero. If so, then in block 334 the neighbor node that sent the Hello message is marked as in a "Normal" mode of operation. The marking may occur, for example, in a table maintained by each node that tracks the RSVP status of each neighbor node. If the Recovery Time value is non-zero, then control passes to block 336, in which the neighbor node is marked as in a recovery mode.

Figure 3C:
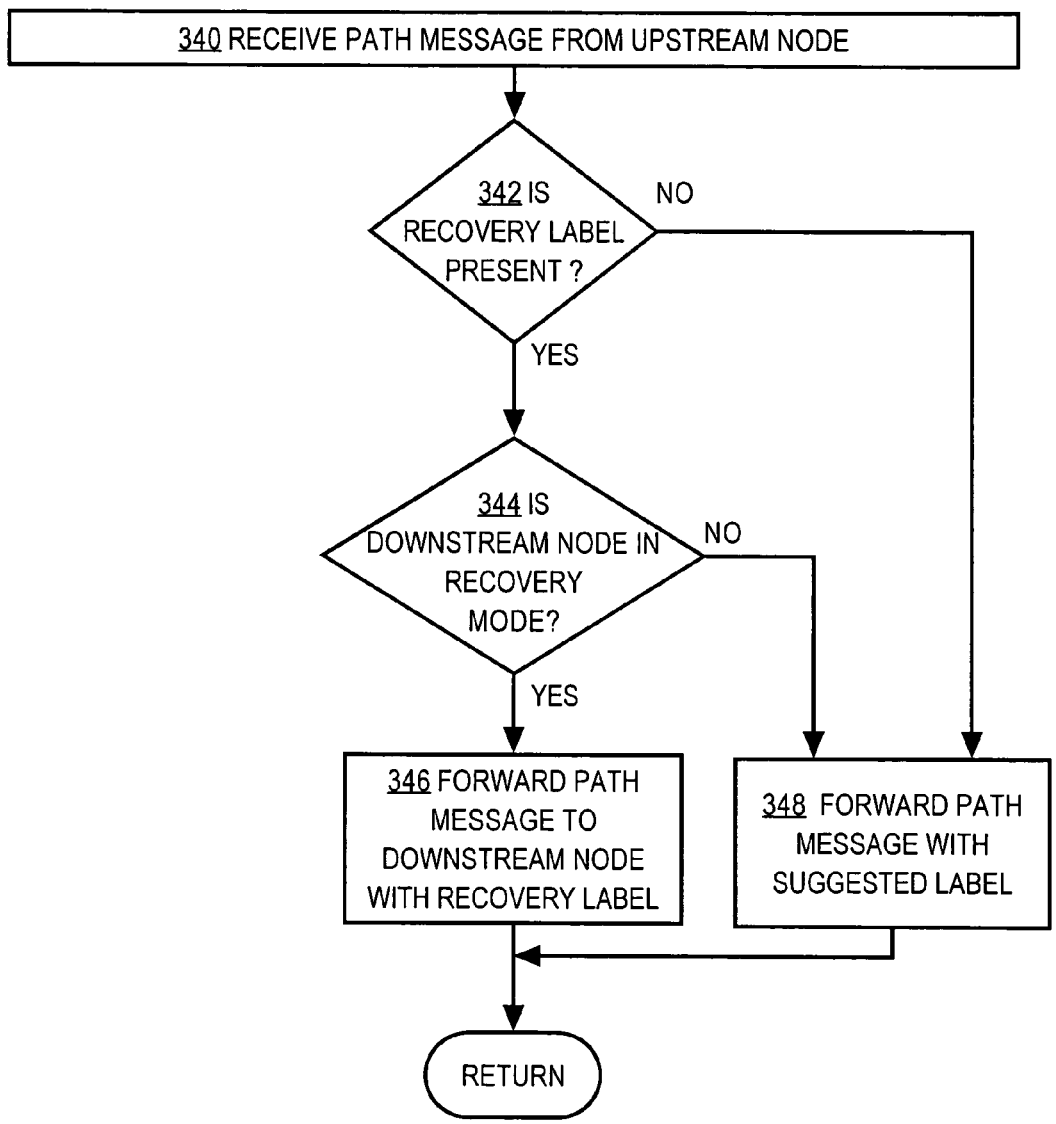
FIG. 3C is a process of handling a PATH message from a restarting node, as performed by a node that neighbors a restarting node.

FIG. 3C is a process of handling a PATH message by a restarting node. In block 340, a PATH message is received from an upstream node. In block 342, a test is performed to determine if a Recovery Label is present in the PATH message. If so, then in block 344 a test is performed to determine if the downstream node to which the PATH message is being sent is in the recovery mode. If so, then in block 346, the PATH message is forwarded to the downstream node with Recovery Label. If not, then in block 348 the PATH message is forwarded with Suggested Label.

Using the foregoing techniques, a first RSVP node can detect whether a second, neighbor node has restarted regardless of the order of restart with respect to the first and second nodes. As a result, the first node can determine whether to forward PATH messages with Recovery Label or Suggested Label, as appropriate or necessary to rebuild label-switched paths with crashed and restarted nodes. Therefore, when multiple RSVP nodes crash relatively concurrently, the multiple nodes can restart gracefully and automatically detect what kind of communication to use in order to rebuild label-switched paths among themselves.

2.2 ERO Recovery Object

If a node experiences a control plane failure and restarts, existing graceful restart procedures do not ensure that Explicit Route Object (ERO) expansion before and after the failure yield the same results. A change in ERO expansion should be avoided as it may lead to undesirable results. According to techniques herein, such a change can be prevented. To support this solution, a new RSVP object, called a Recovery ERO object, is introduced.

The Recovery ERO Object is used during the nodal fault recovery process. The format of Recovery ERO object is identical to that of the ERO object described in RFC 3209. A Recovery ERO object uses Class-Number of the form 10bbbbbb and the same C-Type as the one of the ERO object it is trying to recover.

The following procedures at the restarting node and its neighbors are also provided, according to one embodiment. When a node experiences control plane restart and receives a Path message with Recovery Label from the upstream node, it searches for a matching forwarding state as provided in RFC 3473. If no matching state is found and if ERO expansion is required, then the node considers the Path message as a new LSP. It processes the incoming Path message and performs ERO expansion as specified in RFC 3473 and RFC3209. If the forwarding state is found and if ERO expansion is required, then the node processes the incoming Path message as specified in RFC 3473, RFC 3209 with following modifications:

1. It performs partial ERO expansion at this point to include the strict next hop that is contained in the forwarding state, and the loose hop as in the ERO of the received Path message.

2. It includes the result of the previous step in the Recovery ERO object to be sent as part of the outgoing Path message.

3. The restarting node sends the outgoing Path message out.

When the Path message is received by the neighbor downstream of the restarting node, the following processing occurs:

4. If this message has associated incoming Path and forwarding states, the neighbor node retrieves the ERO object as it was previously created by the restarting node and formats a new Recovery ERO object with this content to be sent upstream.

5. If this message has neither an associated incoming Path state nor a forwarding state, then this should be treated as a normal setup.

6. If this message has no associated Path state but forwarding state is present, then this node is restarting as well and the procedure of the restarting node applies. Once the outgoing Path state is recovered, this node retrieves the outgoing ERO and creates the Recovery ERO object by prepending one or more strict elements as identified by forwarding entry associated with this LSP on this abstract node.

If a new upstream Recovery ERO object is available after executing the steps 4, 5 and 6, then the neighbor node includes the upstream ERO content in a Recovery ERO object to be sent upstream in the Resv message.

When the restarting node receives the Resv message (after step 3), it removes the Recovery ERO object before creating the Reservation State and uses its content to update the ERO in the associated Path State.

In the case where restarting node determines that the downstream node has not been able to include the expanded ERO (e.g. downstream node is also a restarting node and forwarding has not been preserved), the restarting node performs the expansion as described in RFC 3473, RFC 3209. In this case the recovery of the LSP is not guaranteed.

Figure 3D:
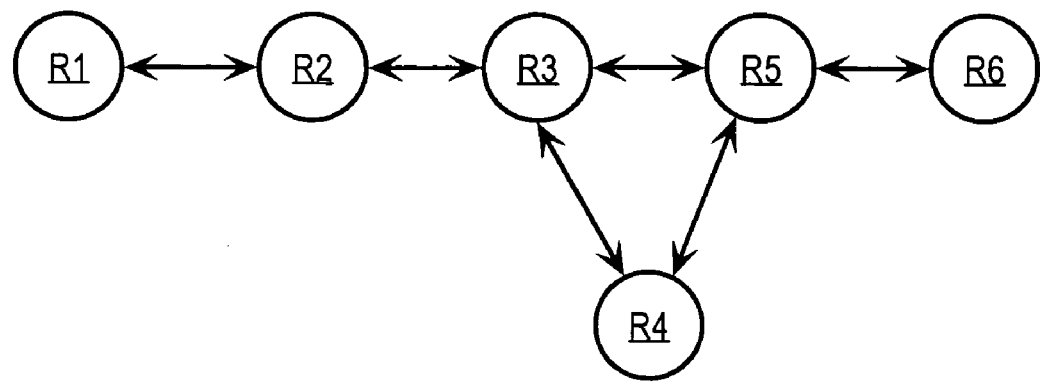
FIG. 3D is a block diagram of a hypothetical network for purposes of illustrating use of the Recovery ERO object.

FIG. 3D is a block diagram of a hypothetical network for purposes of illustrating use of the Recovery ERO object. The network of FIG. 3D comprises routers R1, R2, R3, R4, R5, R6. According to an embodiment of the techniques herein:

1. R1 sends a Path message to R2 with an ERO containing [R2, R6(loose)]. R2 performs ERO expansion [R3, R4, R5, R6] and forwards the Path message to R3. R3 stores this ERO and LSP gets established using normal LSP setup procedures.

2. The control plane on R2 restarts.

3. R2 receives a Path message with Recovery Label and ERO=[R2, R6(loose)]. R2 finds the forwarding state and creates the incoming Path state with ERO=[R2, R6].

4. Based on the forwarding state, R2 determines that the next hop is R3. R2 creates an outgoing Path State with a Recovery ERO=[R2, R3, R6] and forwards the Path message to R3.

5. R3 finds the associated incoming Path State with ERO= [R3, R4, R5, R6] and creates a Recovery ERO with this content. R3 sends the Resv message upstream including the Recovery ERO object that contains: [R3, R4, R5, R6].

6. R2 receives the Resv message, removes the Recovery ERO object and creates the Reservation state.

7. R2 uses the Recovery ERO from the Resv message to create the ERO of the outgoing Path State as [R3, R4, R5, R6] and removes the Recovery ERO.

A node that does not support the Recovery ERO object and the procedure described in Section 2.1 herein ignores the Recovery ERO object and responds with a Resv message. A restarting node may choose to continue the recovery by performing a new ERO expansion. In the case where the new ERO matches the ERO before restart the LSP is recovered. Otherwise, depending on the downstream node implementations, the LSP may be torn down. The extensions specified herein do not affect the processing of the Restart Cap object at nodes that do not support them.

3.0 Implementation Mechanisms—Hardware Overview

Figure 4:
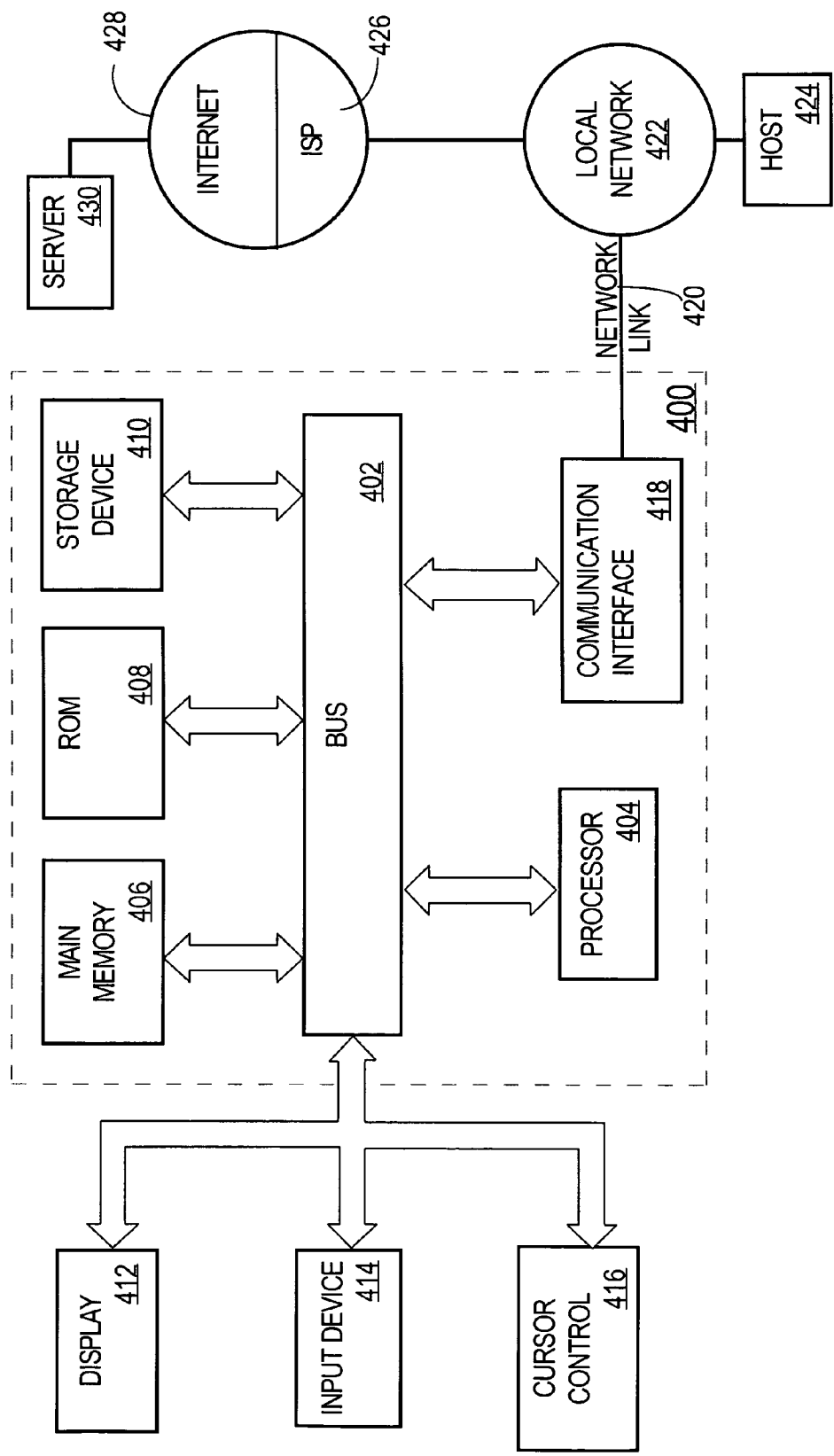
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for restarting RSVP processes in multiple network devices. According to one embodiment of the invention, restarting RSVP processes in multiple network devices are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for restarting RSVP processes in multiple network devices as described herein.

Processor 404 may execute the received code as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of restarting resource reservation protocol (RSVP) processes in multiple network devices, the method comprising the computer-implemented steps, performed in a router and ordered as below, of:
    entering a recovery mode in which a forwarding plane is preserved;
    sending a Hello message to a first neighbor RSVP node, after entering the recovery mode, wherein the Hello message comprises a non-zero Recovery Time value;
    completing the recovery mode, after sending the Hello message;
    sending a Hello message to the first neighbor RSVP node, in response to completing the recovery mode, wherein the Hello message comprises a Recovery Time value of zero.

2. A method as recited in claim 1, further comprising the steps of:
    receiving, from a second neighbor RSVP node, a Hello message having a non-zero Recovery Time value;
    determining that the received Hello message has a non-zero Recovery Time value;
    in response to determining that the received Hello message has a non-zero Recovery Time value, storing information specifying that the second neighbor RSVP node is in a recovery mode.

3. A method as recited in claim 2, further comprising the steps of:
    receiving, from the second neighbor RSVP node, a Hello message having a zero Recovery Time value;
    storing information specifying that the second neighbor RSVP node is in a normal mode.

4. A method as recited in claim 2, wherein the step of storing information further comprises the steps of:
    receiving an RSVP PATH message that contains a Recovery Label;
    forwarding the PATH message to a downstream node with the Recovery Label only in response to determining that the PATH message is being sent to a node that is in recovery mode.

5. A method as recited in claim 4, further comprising forwarding the PATH message to a downstream node with a Suggested Label in response to determining that the PATH message is being sent to a node that is not in recovery mode.

6. A method as recited in any of claims 4 or 5, wherein the determining step is performed based on whether a Recovery Time value in a previously received Hello message is non-zero.

7. A method of restarting RSVP processes in multiple network devices, the method comprising the computer-implemented steps of:
    entering a recovery mode;
    sending a Hello message to a first neighbor RSVP node, wherein the Hello message comprises a non-zero Recovery Time value;
    completing the recovery mode;
    sending a Hello message to the first neighbor RSVP node, wherein the Hello message comprises a Recovery Time value of zero;
    receiving, from a second neighbor RSVP node, a Hello message having a non-zero Recovery Time value;
    storing information specifying that the second neighbor RSVP node is in a recovery mode;
    receiving, from the second neighbor RSVP node, a Hello message having a zero Recovery Time value;
    storing information specifying that the second neighbor RSVP node is in a normal mode;
    receiving an RSVP PATH message that contains a Recovery Label;
    forwarding the PATH message to a downstream node with the Recovery Label only in response to determining that the PATH message is being sent to a node that is in recovery mode;
    forwarding the PATH message to a downstream node with a Suggested Label in response to determining that the PATH message is being sent to a node that is not in recovery mode.

8. A computer-readable volatile or non-volatile medium carrying one or more sequences of instructions for restarting resource reservation protocol (RSVP) processes in multiple network devices, which instructions, when executed by one or more processors, cause the one or more processors to carry out the steps, performed in a router and ordered as below, of:
    entering a recovery mode in which a forwarding plane is preserved;
    sending a Hello message to a first neighbor RSVP node, after entering the recovery mode, wherein the Hello message comprises a non-zero Recovery Time value;
    completing the recovery mode, after sending the Hello message;
    sending a Hello message to the first neighbor RSVP node, in response to completing the recovery mode, wherein the Hello message comprises a Recovery Time value of zero.

9. A computer-readable volatile or non-volatile medium as recited in claim 8, further comprising instructions for performing the steps of:
    receiving, from a second neighbor RSVP node, a Hello message having a non-zero Recovery Time value;
    determining that the received Hello message has a non-zero Recovery Time value;
    in response to determining that the received Hello message has a non-zero Recovery Time value, storing information specifying that the second neighbor RSVP node is in a recovery mode.

10. A computer-readable volatile or non-volatile medium as recited in claim 9, further comprising instructions for performing the steps of:
    receiving, from the second neighbor RSVP node, a Hello message having a zero Recovery Time value;
    storing information specifying that the second neighbor RSVP node is in a normal mode.

11. A computer-readable volatile or non-volatile medium as recited in claim 9, wherein the step of storing information further comprises instructions for performing the steps of:
    receiving an RSVP PATH message that contains a Recovery Label;
    forwarding the PATH message to a downstream node with the Recovery Label only in response to determining that the PATH message is being sent to a node that is in recovery mode.

12. A computer-readable volatile or non-volatile medium as recited in claim 11, further comprising instructions for forwarding the PATH message to a downstream node with a Suggested Label in response to determining that the PATH message is being sent to a node that is not in recovery mode.

13. A computer-readable volatile or non-volatile medium as recited in any of claims 11 or 12, wherein the determining step is performed based on whether a Recovery Time value in a previously received Hello message is non-zero.

14. An apparatus in a router for restarting resource reservation protocol (RSVP) processes in multiple network devices, comprising:
- means for entering a recovery mode in which a forwarding plane is preserved;
- means for sending a Hello message to a first neighbor RSVP node, after entering the recovery mode, wherein the Hello message comprises a non-zero Recovery Time value;
- means for completing the recovery mode, after sending the Hello message;
- means for sending a Hello message to the first neighbor RSVP node, in response to completing the recovery mode, wherein the Hello message comprises a Recovery Time value of zero;
- wherein the means operate as ordered above.

15. An apparatus as recited in claim 14, further comprising:
- means for receiving, from a second neighbor RSVP node, a Hello message having a non-zero Recovery Time value;
- means for determining that the received Hello message has a non-zero Recovery Time value;
- means for storing information specifying that the second neighbor RSVP node is in a recovery mode in response to determining that the received Hello message has a non-zero Recovery Time value.

16. An apparatus as recited in claim 15, further comprising:
- means for receiving, from the second neighbor RSVP node, a Hello message having a zero Recovery Time value;
- means for storing information specifying that the second neighbor RSVP node is in a normal mode.

17. An apparatus as recited in claim 15, wherein the means for storing information further comprises:
- means for receiving an RSVP PATH message that contains a Recovery Label;
- means for forwarding the PATH message to a downstream node with the Recovery Label only in response to determining that the PATH message is being sent to a node that is in recovery mode.

18. An apparatus as recited in claim 17, further comprising means for forwarding the PATH message to a downstream node with a Suggested Label in response to determining that the PATH message is being sent to a node that is not in recovery mode.

19. An apparatus as recited in any of claims 17 or 18, wherein the means for determining is based on whether a Recovery Time value in a previously received Hello message is non-zero.

20. An apparatus for restarting resource reservation protocol (RSVP) processes in multiple network devices, comprising:
- a network interface that is coupled to the data network for receiving one or more packet flows therefrom;
- a processor;
- one or more stored sequences of instructions which, when executed by the processor, cause the processor to carry out the steps, ordered as below, of:
- entering a recovery mode in which a forwarding plane is preserved;
- sending a Hello message to a first neighbor RSVP node, after entering the recovery mode, wherein the Hello message comprises a non-zero Recovery Time value;
- completing the recovery mode, after sending the Hello message;
- sending a Hello message to the first neighbor RSVP node, in response to completing the recovery mode, wherein the Hello message comprises a Recovery Time value of zero.

21. An apparatus as recited in claim 20, further comprising sequences of instructions for performing the steps of:
- receiving, from a second neighbor RSVP node, a Hello message having a non-zero Recovery Time value;
- determining that the received Hello message has a non-zero Recovery Time value;
- in response to determining that the received Hello message has a non-zero Recovery Time value, storing information specifying that the second neighbor RSVP node is in a recovery mode.

22. An apparatus as recited in claim 21, further comprising the steps of:
- receiving, from the second neighbor RSVP node, a Hello message having a zero Recovery Time value;
- storing information specifying that the second neighbor RSVP node is in a normal mode.

23. An apparatus as recited in claim 21, wherein the step of storing information further comprises the steps of:
- receiving an RSVP PATH message that contains a Recovery Label;
- forwarding the PATH message to a downstream node with the Recovery Label only in response to determining that the PATH message is being sent to a node that is in recovery mode.

24. An apparatus as recited in claim 23, further comprising forwarding the PATH message to a downstream node with a Suggested Label in response to determining that the PATH message is being sent to a node that is not in recovery mode.

25. An apparatus as recited in any of claims 23 or 24, wherein the determining step is performed based on whether a Recovery Time value in a previously received Hello message is non-zero.

* * * * *